(12) United States Patent
Gantert

(10) Patent No.: US 6,705,498 B2
(45) Date of Patent: Mar. 16, 2004

(54) ADJUSTABLE GUN CASE BRACKET

(76) Inventor: Patrick K. Gantert, N1683 Boulder Ct., LaCrosse, WI (US) 54601

( * ) Notice: Subject to any disclaimer, the term of this patent is extended or adjusted under 35 U.S.C. 154(b) by 145 days.

(21) Appl. No.: 10/017,872

(22) Filed: Dec. 13, 2001

(65) Prior Publication Data

US 2003/0111500 A1 Jun. 19, 2003

(51) Int. Cl.$^7$ ............................................... B60R 7/00
(52) U.S. Cl. ................... 224/401; 224/282; 224/547; 224/553; 224/558; 224/913
(58) Field of Search ........................ 224/401, 282, 224/547, 548, 553, 558, 555, 913

(56) References Cited

U.S. PATENT DOCUMENTS

| | | |
|---|---|---|
| 3,744,687 A | 7/1973 | Oreck |
| 4,823,673 A | 4/1989 | Downing |
| 4,915,273 A | 4/1990 | Allen |
| D309,675 S | 8/1990 | Kolpin |
| 5,564,610 A * | 10/1996 | Barron ................... 224/268 |
| 5,595,333 A | 1/1997 | Boston |
| 5,697,181 A | 12/1997 | Savant |
| 5,706,990 A | 1/1998 | Lahrson |
| 5,878,929 A | 3/1999 | Leonard |
| D421,179 S | 2/2000 | Kolpin |
| 6,021,936 A | 2/2000 | Savant |
| 6,142,349 A | 11/2000 | Roberson |
| 6,145,718 A * | 11/2000 | Edwards ................ 224/401 |
| D452,290 S | 12/2001 | Kolpin |
| 6,382,484 B1 | 5/2002 | Savant |
| 6,457,618 B1 * | 10/2002 | Hancock et al. ....... 224/401 |
| 6,484,913 B1 * | 11/2002 | Hancock et al. ....... 224/401 |

* cited by examiner

*Primary Examiner*—Stephen K. Cronin
(74) *Attorney, Agent, or Firm*—Godfrey & Kahn, S.C.

(57) ABSTRACT

An adjustable bracket for carrying a gun case on a vehicle consists of a plate to be attached to the vehicle, a gun case carrier, and an adjustable linkage connecting the plate to the gun case carrier. The adjustable linkage allows the gun case carrier to be rotated to a variety of angles relative to the plate. A lock holds the gun case carrier at the desired angle.

15 Claims, 3 Drawing Sheets

ADJUSTABLE GUN CASE BRACKET

BACKGROUND OF THE INVENTION

This invention relates to a bracket for transporting a firearm case on an all-terrain vehicle (ATV) and more particularly to a bracket that is adjustable relative to the ATV.

Long guns, which include rifles and shotguns have been carried in scabbards on ATVs. However, none of the prior long gun holding apparata have included an adjustment mechanism to allow the holding apparatus to be adjusted relative to the ATV.

It is desirable to allow the gun carrier to be adjustable so that, for example, it can be in a horizontal position or in a non-horizontal position.

SUMMARY OF THE INVENTION

An adjustable bracket for carrying a gun case on a vehicle, the adjustable bracket comprising
 a) a plate adapted to be attached to the vehicle;
 b) a gun case carrier; and
 c) an adjustable linkage connecting the plate to the gun case carrier.

A principal object and advantage of the present invention is that the gun case carrier is adjustable relative to the vehicle.

Another principal object and advantage of the present invention is that the gun case carrier is lockable at various positions relative to the vehicle.

Another principal object and advantage of the present invention is the gun case carrier can be adjusted and locked relative to the vehicle by hand and without the use of any tools.

DETAILED DESCRIPTION OF THE PREFERRED EMBODIMENT

Figure 1:
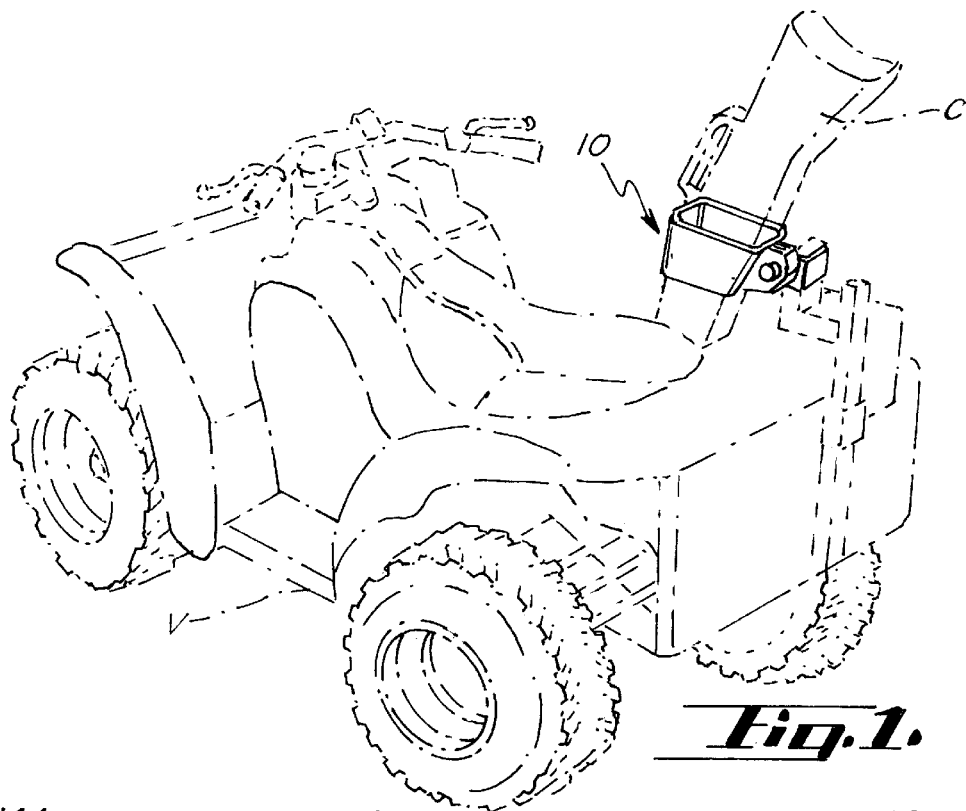
FIG. 1 shows the adjustable gun case bracket of the present invention mounted on an all-terrain vehicle.
Figure 2:
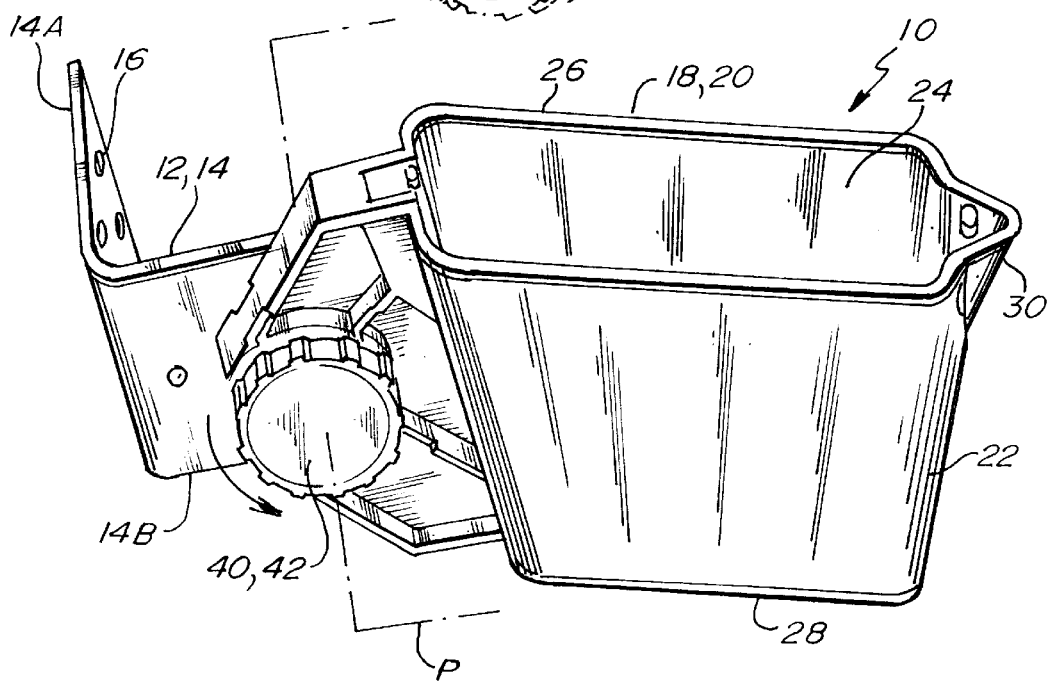
FIG. 2 is a top perspective view of the adjustable gun case bracket of the present invention from one side.
Figure 3:
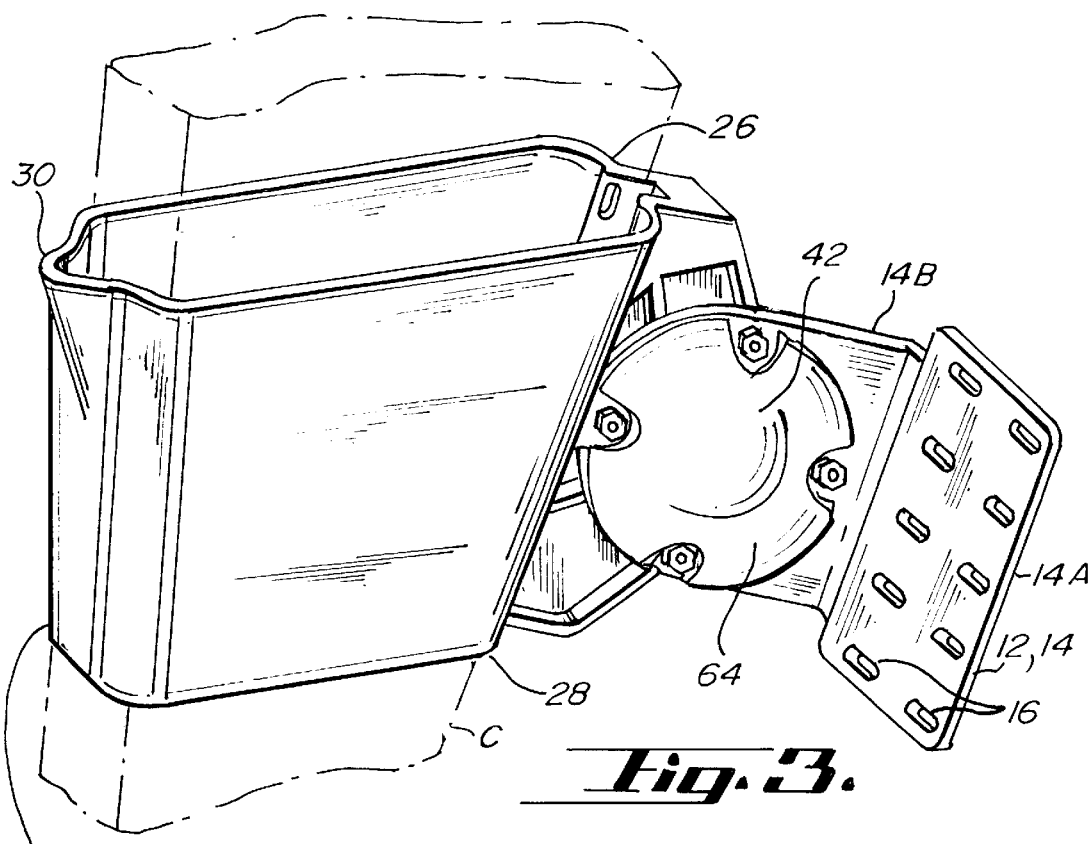
FIG. 3 is a top perspective view of the adjustable gun case bracket of the present invention from the opposite side.
Figure 4:
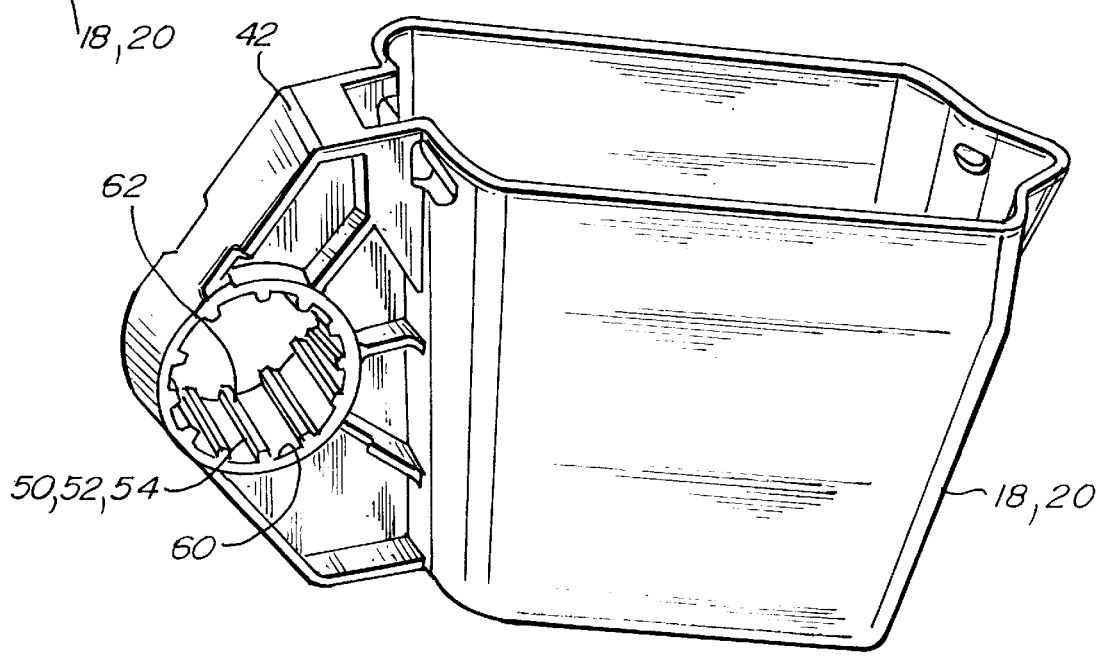
FIG. 4 is a perspective view of the adjustable gun case bracket of the present invention with some parts removed to show the internal spline bushing.
Figure 5:
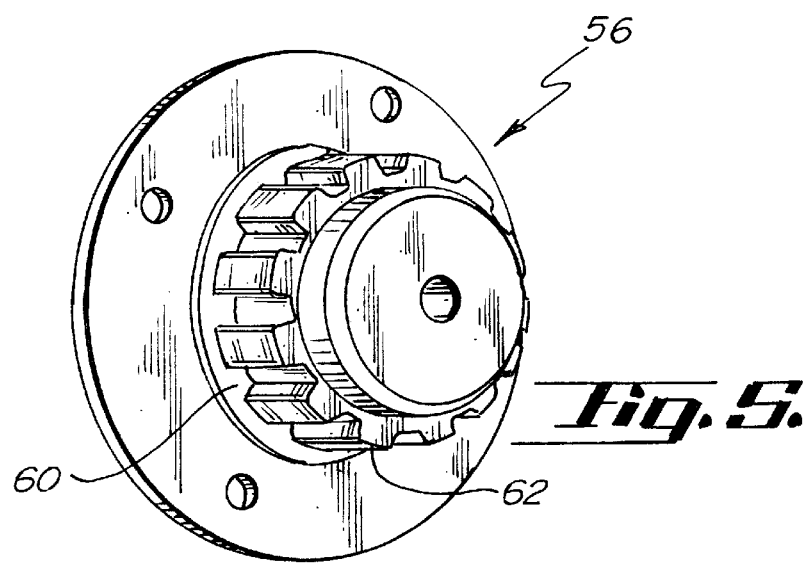
FIG. 5 is a perspective view of a rotating spline bushing that mates with the spline bushing of FIG. 3.
Figure 6:
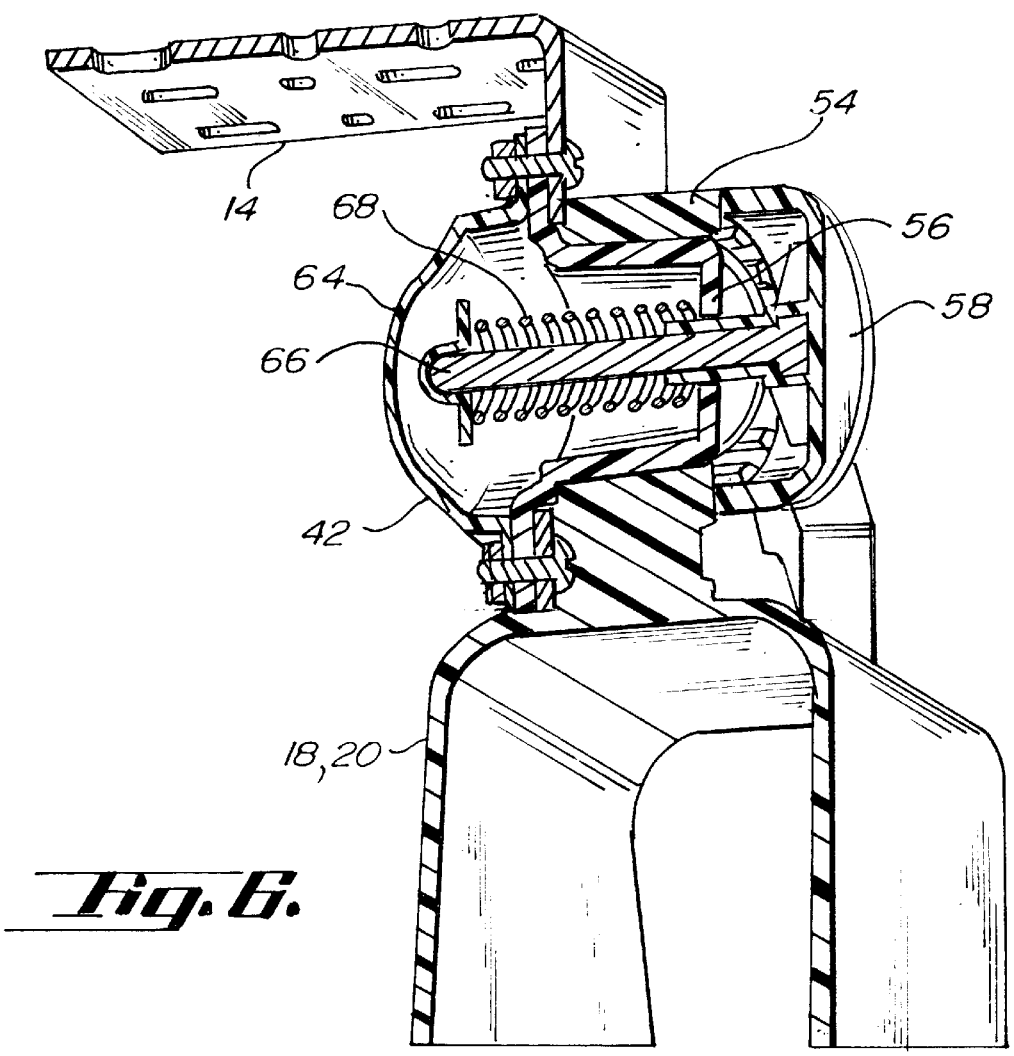
FIG. 6 is a top perspective view of the adjustable gun case bracket of the present invention with structure cut away to show the internal detail of the locking mechanism.

The adjustable gun case bracket of the present invention is generally shown in the Figures as reference numeral 10.

In one aspect, the adjustable gun case bracket 10 comprises a means 12 for attaching the bracket 10 to a vehicle V. The means for attaching 12 can be any suitable attachment mechanism, such as a plate, angle bracket, brace, rod, clamp, etc.

In the preferred embodiment, the means for attaching 12 comprises a plate 14 adapted to be attached to the vehicle V, as by screws or bolts (not shown) passing through holes 16. Most preferably, the plate 14 further comprises a first portion 14A adapted to be attached to the vehicle V and a second portion 14B substantially perpendicular to the first portion 14A.

The adjustable gun case bracket 10 further comprises a means 18 for holding a gun case C. The means for holding can be any suitable mechanism for releasably holding the gun case C, such as a scabbard, tube, clamp, etc.

In the preferred embodiment, the means for holding 18 comprises a gun case carrier 20, which further comprises an elongate member 22 having a hollow interior 24. The elongate member 22 has an open top 26 and an open bottom 28. Preferably, the top 26 is wider than the bottom 28, so that as the gun case C is inserted into the member 22 the bottom comes to grip the gun case C, the gun case C being narrower at on end than at the other. The elongate member 22 also preferably has a cut-out 30 that allows the case C to be easily grasped for removal from the gun case carrier 20.

The adjustable gun case bracket 10 further comprises a means 40 for rotating the means for holding 18 relative to the means for attaching 12, as to allow the gun case to lie at a variety of angles relative to the vehicle V, e.g., horizontal or not. The means for rotating 40 can be any mechanism that permits rotation of the means for holding 18 relative to the means for attaching 12, such as a pivot, swivel, etc.

The adjustable gun case bracket 10 further comprises a means 50 for locking the means for holding 18 at an angle relative to the means for attaching 12. Any number of angles may be allowed, or the number of angles may be finite. It is highly desirable that the locking means 50 is operable by hand without the use of any tools. The locking means 50 can be any mechanism that can be releasably set to hold the means for holding at an angle relative to the means for attaching 12, such as a screw, nut, clamp, cam, spring, strap, etc.

The means for rotating 40 preferably comprises an adjustable linkage 42 connecting the plate 14 to the gun case carrier 20. The adjustable linkage is connected to the second portion 14B of the plate 14. As can be seen from the drawings, the adjustable linkage 42 permits rotation of the gun case carrier 20 in a plane P parallel to the second portion 14B.

A locking member 52 holds the gun case carrier 20 at an angle relative to the first portion 14A of the plate 14. Preferably, the locking member 52 further comprises a first spline bushing 54 fixed relative to the gun case carrier 20, a second spline bushing 56 rotatably engaging the first spline bushing 54, and a knob 58 causing the second spline bushing 56 to clamp to the first spline bushing 54.

The first and second spline bushings 54, 56 have mating slots 60 and projections 62 that can be used to stop further rotation of the bushings relative to one another.

The locking member 52 may preferably further comprise a cap 64 opposite the knob 58, a shaft 66 engaging the knob 58 and cap 64, and a spring 68 biasing the knob 58 away from the cap 64.

To change the angle of the gun case carrier 20 relative to the plate 14, the user turns the knob 58. As the knob 58 is turned, the spring 68 expands the cap 64 away from the knob 58, which in turn relieves cramping pressure of the the second spline bushing 56 against the first spline bushing 54. The second spline bushing 56 may then be moved slightly away from the first spline bushing 54, allowing the gun case carrier 20 to be rotated. Rotation may be stopped at any point at which one of the projections 62 mates with one of the slots 60.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. An adjustable bracket for carrying a gun case on a vehicle, the adjustable bracket comprising:

a plate adapted to be attached to the vehicle;

a gun case carrier; and, an adjustable linkage connecting the plate to the gun case carrier, wherein the adjustable linkage permits rotation of the gun case carrier relative to the plate, the adjustable linkage having a locking member holding the gun case carrier at an angle relative to the plate, wherein the locking member further comprises a first spline bushing fixed relative to the gun case carrier, a second spline bushing rotatably engaging the first spline bushing, and a knob causing the second spline bushing to clamp to the first spline bushing.

2. The adjustable bracket of claim 1, wherein the locking member further comprises a cap opposite the knob, a shaft engaging the knob and the cap, and a spring biasing the knob away from the cap.

3. An adjustable bracket for carrying a gun case on a vehicle, the adjustable bracket comprising:

a plate adapted to be attached to the vehicle, the plate having a first portion adapted to be attached to the vehicle and a second portion substantially perpendicular to the first portion:

a gun case carrier; and, an adjustable linkage connecting the plate to the gun case carrier, wherein the adjustable linkage permits rotation of the gun case carrier in a plane parallel to the second portion of the plate, the adjustable linkage having a locking member holding the gun case carrier at an angle relative to the first portion of the plate, wherein the locking member further comprises a first spline bushing fixed relative to the gun case carrier, a second spline bushing rotatably engaging the first spline bushing, and a knob causing the second spline bushing to clamp to the first spline bushing.

4. The adjustable bracket of claim 3, wherein the locking member further comprises a cap opposite the knob, a shaft engaging the knob and the cap, and a spring biasing the knob away from the cap.

5. An adjustable bracket system for carrying a gun case on a vehicle comprising:

a bracket adapted to be attached to the vehicle;

a gun case carrier; and, an adjustable linkage connecting the gun case carrier to the bracket through a single attachment point such that the gun case carrier is selectively positionable relative to the bracket.

6. The adjustable bracket system of claim 5 wherein the adjustable linkage is lockable.

7. The adjustable bracket system of claim 5 wherein the adjustable linkage comprises a first spline bushing on the bracket and a second spline bushing on the gun case carrier, the first spline bushing selectively interacting with the second spline bushing.

8. The adjustable bracket system of claim 7 wherein first spline bushing is fixed relative to the gun case carrier.

9. The adjustable bracket system of claim 7 wherein the adjustable linkage further comprises a knob that, upon rotation thereof, causes the first spline bushing and the second spline bushing to clamp together.

10. The adjustable bracket system of claim 9 wherein the adjustable linkage further comprises a cap opposite the knob and a shaft engaging the knob and the cap.

11. An adjustable bracket system for carrying a gun case on a vehicle comprising:

a bracket adapted to be attached to the vehicle;

a gun case carrier; and, a lockable means for connecting the gun case carrier to the bracket through a single attachment point such that the gun case carrier is selectively positionable relative to the bracket.

12. The adjustable bracket system of claim 11 wherein the lockable means comprises a first spline bushing on the bracket and a second spline bushing on the gun case carrier, the first spline bushing selectively interacting with the second spline bushing.

13. The adjustable bracket system of claim 12 wherein first spline bushing is fixed relative to the gun case carrier.

14. The adjustable bracket system of claim 12 wherein the means further comprises a knob that causes the first spline bushing and the second spline bushing to clamp together.

15. The adjustable bracket system of claim 14 wherein the means further comprises a cap opposite the knob and a shaft engaging the knob and the cap.

* * * * *